(12) United States Patent
Labaton et al.

(10) Patent No.: US 6,236,724 B1
(45) Date of Patent: May 22, 2001

(54) METHODS AND APPARATUS FOR ENCODING AND DECODING DATA TRANSMITTED OVER TELEPHONE LINES

(75) Inventors: Isaac J. Labaton, Jerusalem (IL); Michael K. Kelly, Phoenix, AZ (US)

(73) Assignee: Enco-Tone Ltd. (IL)

( * ) Notice: Subject to any disclaimer, the term of this patent is extended or adjusted under 35 U.S.C. 154(b) by 0 days.

(21) Appl. No.: 08/809,886

(22) PCT Filed: Oct. 4, 1995

(86) PCT No.: PCT/US95/12979

§ 371 Date: Jul. 24, 1997

§ 102(e) Date: Jul. 24, 1997

(87) PCT Pub. No.: WO96/10880

PCT Pub. Date: Apr. 11, 1996

(30) Foreign Application Priority Data

Oct. 4, 1994 (IL) ......................................... 111157

(51) Int. Cl.[7] .................................................. H04M 1/00
(52) U.S. Cl. .......................... 379/355; 379/352; 379/361; 379/386; 379/283; 379/93.18; 379/93.23; 379/93.26; 379/93.27; 379/399; 379/353; 379/368; 379/444; 340/825.44
(58) Field of Search ................................ 379/352, 361, 379/386, 283, 93.18, 93.23, 93.26, 93.27, 399; 340/825.44; 379/353, 368, 444, 355

(56) References Cited

U.S. PATENT DOCUMENTS

| | | | |
|---|---|---|---|
| 4,620,294 | * | 10/1986 | Leung et al. ........................ 375/222 |
| 4,799,254 | * | 1/1989 | Dayton et al. ..................... 379/93.26 |
| 5,181,744 | * | 1/1993 | Betheil ................................... 283/56 |
| 5,249,220 | * | 9/1993 | Moskowitz et al. ............... 379/93.19 |
| 5,283,826 | * | 2/1994 | Kurosawa et al. .................... 379/357 |
| 5,311,516 | * | 5/1994 | Kuznicki et al. ................ 340/825.44 |
| 5,325,427 | * | 6/1994 | Dighe .................................... 379/386 |
| 5,459,784 | * | 10/1995 | Tzeng .................................... 379/386 |
| 5,495,526 | * | 2/1996 | Cesaro et al. ......................... 379/386 |
| 5,561,710 | * | 10/1996 | Helms ............................... 379/93.27 |
| 5,825,817 | * | 10/1998 | Mark .................................... 379/355 |
| 5,873,032 | * | 2/1999 | Cox et al. ............................. 455/414 |
| 5,878,131 | * | 3/1999 | Boie ..................................... 379/361 |

* cited by examiner

Primary Examiner—Wing F. Chan
(74) Attorney, Agent, or Firm—Snell & Wilmer L.L.P.

(57) ABSTRACT

A method of generation and detection of acoustic signals carrying alpha-numeric data for reducing the effects of noise and thereby improving signal transmission without the need to boost the power of the signal. In accordance with one aspect of the invention, a special DTMF acoustic signal consisting of a combination of two frequencies will be generated for the representation of a particular alpha-numeric character that will be similar to the standard DTMF tone. The difference between the amplitudes of both frequencies varies during the time of generation of the DTMF tone in such a way that both signals will arrive at a final destination detector, i.e., an interactive voice response board, at least for a portion of the generation time, at a relatively similar amplitude, thereby substantially increasing the probabilities of being recognized as a DTMF signal.

10 Claims, 5 Drawing Sheets

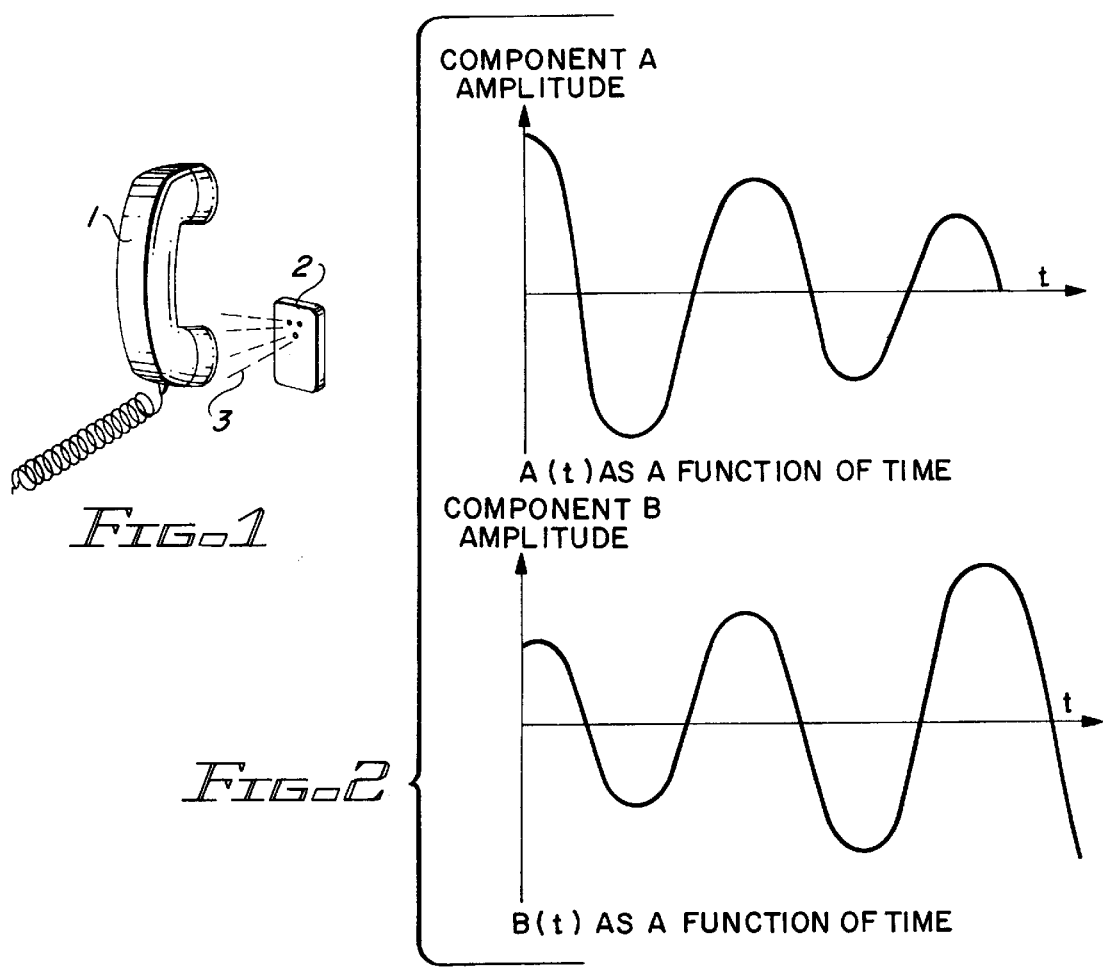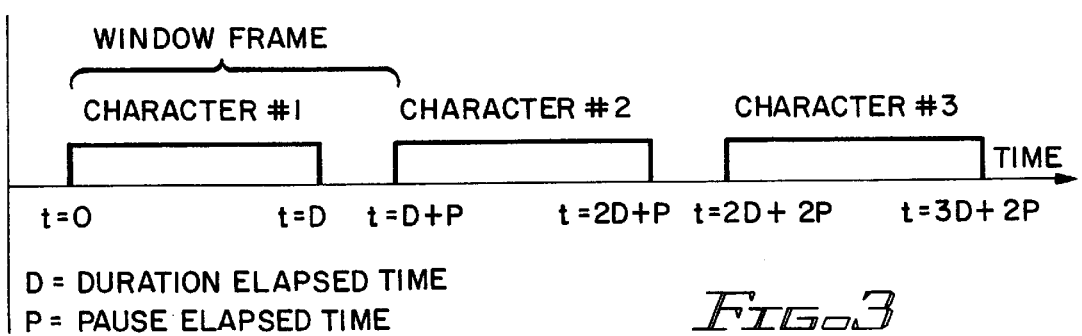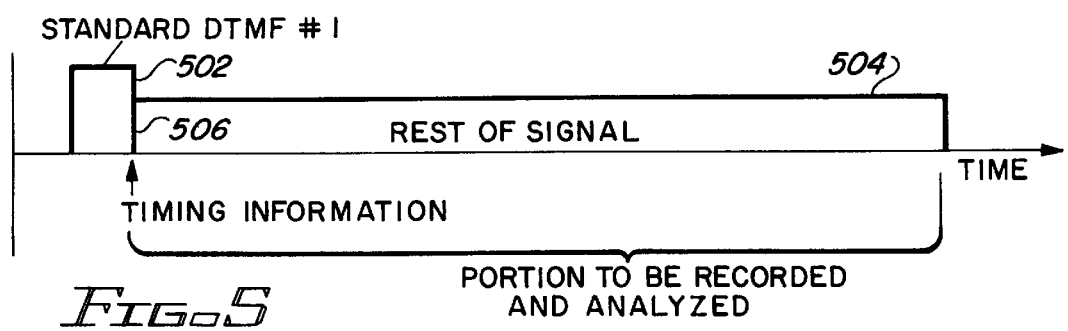

PRECALCULATED TABLES IN ORDER
TO MINIMIZE "DETECTION TIME"

FOURIER CONVERSION 4.1 $\quad A[K] = \dfrac{2}{N} \sum_{i=0}^{N=1} (X[i] \cdot \cos(2\pi \cdot F[K] \cdot i)) \qquad 0 \leq K < 8$ 4.2 $\quad B[K] = \dfrac{2}{N} \sum_{i=0}^{N=1} (X[i] \cdot \sin(2\pi \cdot F[K] \cdot i)) \qquad 0 \leq i < 200$ $D[K] = F[K] \cdot 2\pi / 8000$ $\text{TABLE\_OF\_COS}[i,j] = \cos(D[i] \cdot j) \qquad 0 \leq i < 8$ $\text{TABLE\_OF\_SIN}[i,j] = \sin(D[i] \cdot j) \qquad 0 \leq j < 200$

200 BYTES

*FIG. 4*

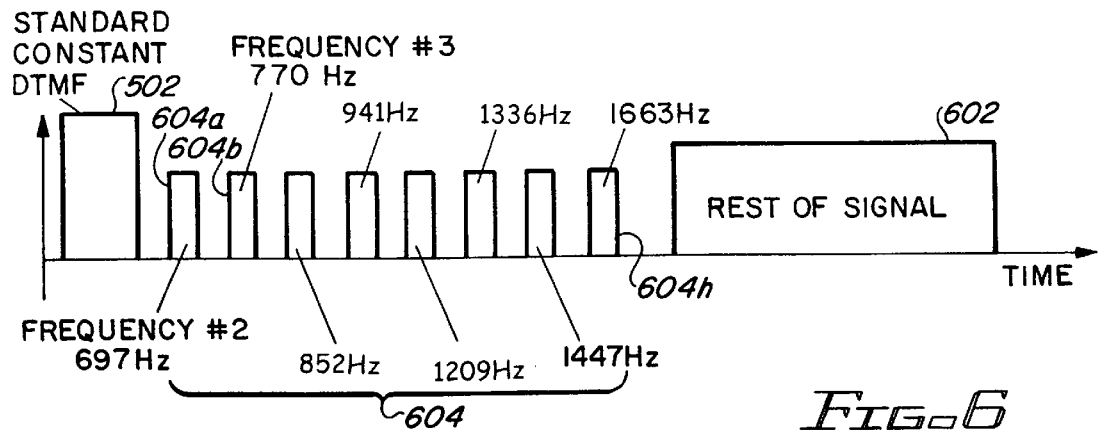

*FIG. 6*

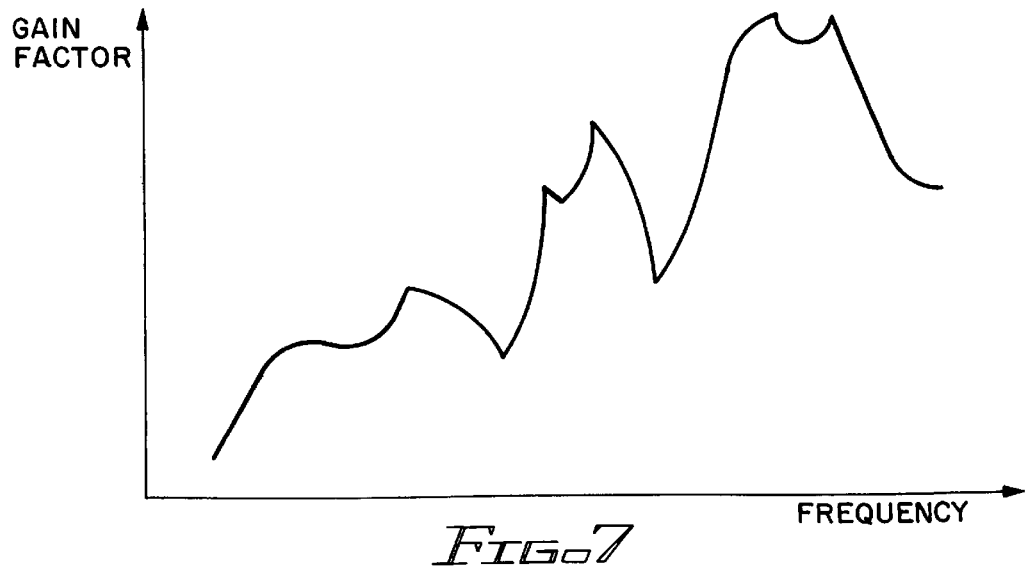

*FIG. 7*

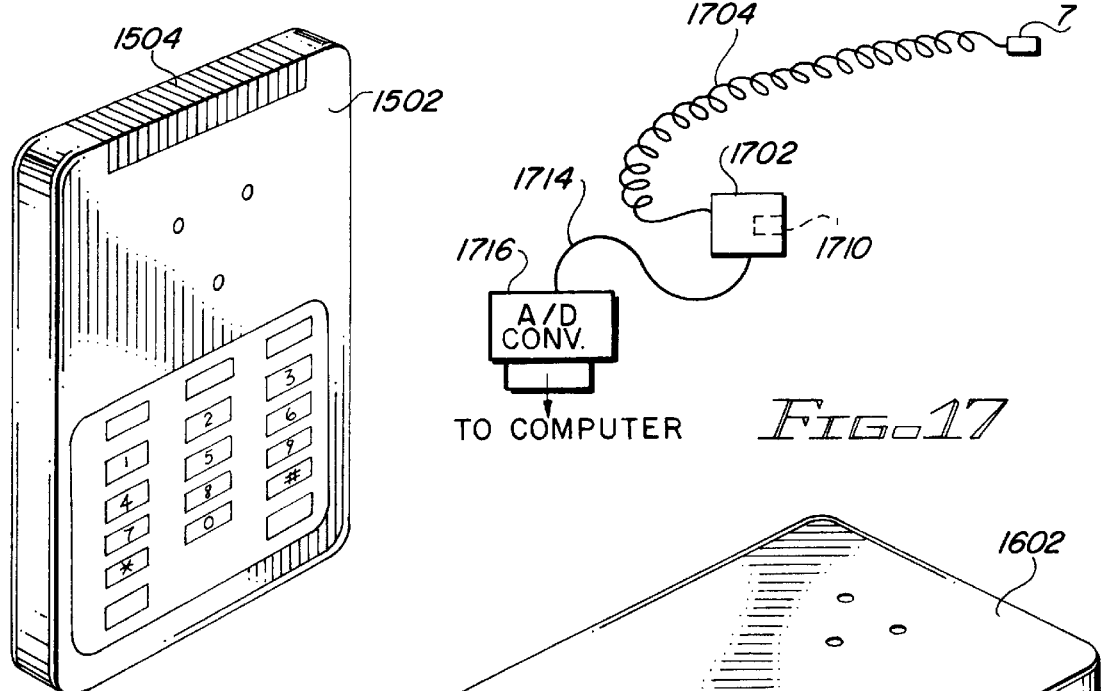
FIG.-17
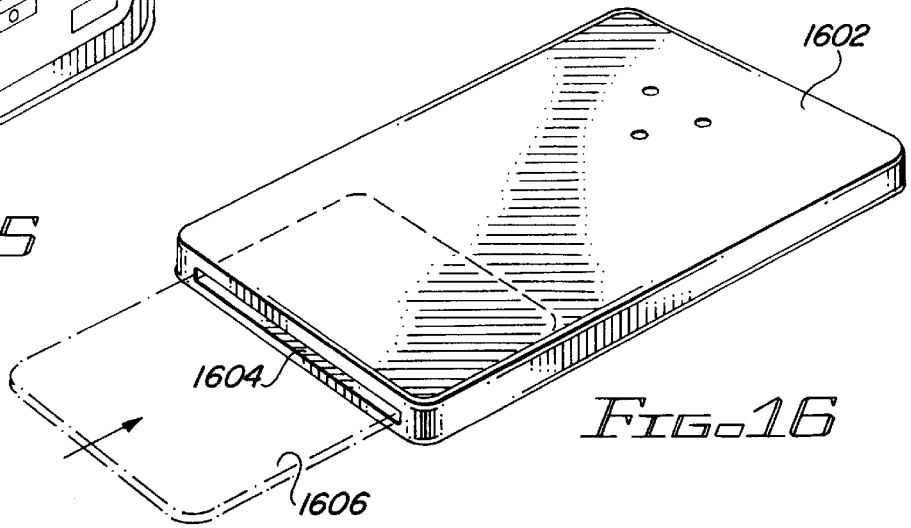
FIG.-15
FIG.-16
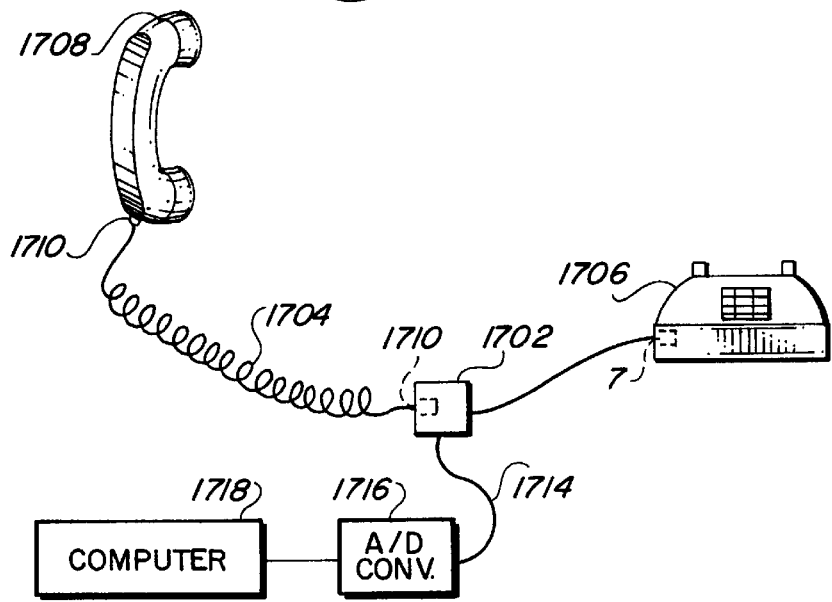
FIG.-18

US 6,236,724 B1

METHODS AND APPARATUS FOR ENCODING AND DECODING DATA TRANSMITTED OVER TELEPHONE LINES

TECHNICAL FIELD

The present invention relates, generally, to the acoustic transmission of information and, more particularly to methods an apparatus for generating, transmitting, and processing acoustic data and the digital data representative thereof.

BACKGROUND ART AND TECHNICAL PROBLEMS

The amount of data and information routinely transmitted on a world-wide basis over the world's existing 1.2 billion telephones and associated telephone lines continues to increase. Digital and analog data transmitted over telephone lines is often generated through modems and received by other modems, without at any time exhibiting an acoustic characteristic (i.e. an audible signal) at any time. In addition, data and information which is voice coupling based, for example normal conversation, has an acoustic characteristic. Data and information having an acoustic characteristic continues to constitute a substantial portion of the information sent over telephone lines. This information has the characteristic of being acoustic at at least some point before being converted, through the use of transducers such as microphones, into electromagnetic signals and transmitted over physical lines (e.g. optical fibers, cables, wires, and the like) or, alternatively, transmitted via stations such as satellites as electromagnetic waves.

With regard to voice coupled or acoustic information, it is known that the digital information is transmitted as acoustic waves at least for a portion of its path, for example from the sound generator to the sound transducer (e.g. microphone) which resides in a typical telephone mouthpiece.

One know prior art application of acoustic coupling involves a modem device used as an acoustic coupling device, such as an acoustic coupling cradle for receiving a telephone headset in intimate physical contact with the acoustic coupling device. This method of acoustic coupling of the telephone headset with the telephone line has largely been replaced with the technique of electrically connecting the modem directly to the telephone lines, thus substantially increasing the rate of transmission of information.

A further known example of acoustic coupling involves the well-known Dual Tone Multi-Frequency (DTMF) scheme. In the most popular DTMF scheme, digital information is transmitted as voice coupled (acoustic) information. In a typical DTMF system a person presses a button on a telephone keypad, where upon two phenomena occur. In the first instance, a characteristic sound associated with the depressed button is generated and played through the telephone headset such that it is audible to the user. In addition, an electrical signal associated with the depressed key is generated for transmission by the telephone to a desired destination. Thus, the term "DTMF" encompasses both an electrical magnetic DTMF and an acoustic DTMF.

Other devices are generally known which generate DTMF tones, but which are separate from the telephone. For example, DTMF generating modules are known which generate tones as an acoustic wave outside the phone, for example by a Tone Dialer. The acoustic wave generated by the Tone Dialer may be picked up by the telephone headset microphone and transmitted through the telephone to a desired destination.

A popular use of DTMF devices involves their use with Interactive Voice Response (IVR) boards, for example through the use of DTMF tones to chose a particular item from a verbal menu. That is, when a caller desires to interact with an IVR system, the caller dials up a telephone line associated with the IVR computer through the use of a conventional telephone. The IVR board associated with the central computer generates human audible voice commands, and prompts the caller to select various menu options through the use of DTMF tones.

The acoustic DTMF tone may be characterized as a sound associated with a particular button pressed by the caller. This is true whether the caller employs the Keypad on the telephone to generate DTMF tones or, alternatively, if the caller uses a separate DTMF or tone dialing module to generate the DTMF tones. In either case, the sound is typically composed of two frequency components: a first frequency selected out of a group of four "low" frequencies, and a second frequency selected from a group of four "high" frequencies. This two frequency tone is picked up by the microphone in the telephone headset, and eventually converted into an electrical signal (the electromagnetic DTMF). This signal then travels through the phone lines until it reaches its destination, carrying the digital information encoded as an analog electromagnetic wave. The IVR board detects the signal through the use of an array of hardware and/or software filters. When the IVR board processes the signal and identifies the particular DTMF tone, it informs the computer associated with the IVR board of the particular "button" depressed by the caller, for example one of the numbers 0–9 or the characters "*" and "#".

Another popular use of voice coupled information surrounds the dialing function employed by telephone networks having a Central Office which is DTMF capable but for which at least some of the telephones associated with the telephone network are not DTMF capable. More particularly, in the case of "non-touch tone telephones" (also referred to as "rotary" or "pulse" telephones), a DTMF tone dialer may be employed by the user of a non-DTMF telephone to acousticly generate DTMF tones in order to dial a number or otherwise communicate with a DTMF-based destination. The acoustic DTMF signal generated by the tone dialer is picked by the transducer at the telephone, and converted into a DTMF electromagnetic signal and thereafter transmitted by the telephone.

Other uses and applications of acoustic coupling techniques are set forth in Patent Cooperation Treaty (PCT) application serial no. PCT/US92/10492, the entire disclosure of which is hereby incorporated by this reference. For example, acoustic coupling devices may be used in the context of over-the-phone identification systems based on the use of special tone dialers which generate a string of acoustic DTMF signals representative of credit card transaction data, digital signatures, and other data and information.

Theoretically, digital information may be transmitted over telephone lines by associating a different frequency with the various digital characters sought to be transmitted, much in the nature of a conversion table. Such a table would theoretically assign to each alphanumeric character a unique frequency. In this way, each time a sound wave corresponding to particular frequency is applied to the telephone transducer, it would be converted into an electrical signal representative of that same frequency and transmitted. When the signal is detected at the destination, the respective alphanumeric character corresponding to that particular frequency would be detected by the destination. While perhaps viable theoretically, this approach is problematic in several respects.

For example, electrical and acoustic noises are inevitably present in the background, transmission hardware, and other aspects of the transmission system. Consequently, the detection filters will inevitably detect spurious frequency activity.

To reduce the incidence of spurious noise in the context of DTMF systems, the existing DTMF paradigm has evolved with a first set of low frequencies (e.g. 697 Hz, 770 Hz, 852 Hz, and 941 Hz) and a second set of high frequencies (e.g. 1209 Hz, 1336 Hz, 1447 Hz, and 1663 Hz). By requiring the detection of one frequency from the low frequency group simultaneously with one frequency from the high frequency group, wherein both frequencies are required to exceed a minimum amplitude threshold, a substantial amount of spurious background noise may be eliminated. Nevertheless, existing DTMF systems remain susceptible to the detection of false DTMF signals and the non-detection of true DTMF signals.

A further problem associated with existing DTMF signals surrounds the fact that transmission line quality can vary from call to call, even when using the same telephone, as well as the fact that noise may be generated at virtually any stage during transmission. Finally, such factors as absorption and gain along the transmission lines affect different frequencies to different degrees. In order to overcome some of these difficulties, existing DTMF systems may require a specific range of amplitude for respective activities, i.e. a minimal amplitude.

A further problem associated with acoustic coupling systems involve the frequency response characteristic of the telephone mouth piece transducer (e.g. microphone). In particular, the transmission of data using sound waves, in particular acoustic DTMF signals, may be adversely affected by the transducers frequency response characteristic, and thus may impact the accuracy with which acoustic signals are converted into electrical signals. Moreover, the frequency response characteristics vary from telephone to telephone; the frequency response characteristic for a particular telephone may even change with the physical position of the microphone in respect of the local vertical or gravitational line.

Yet a further problem associated with existing DTMF voice coupling systems surrounds the elapsed transmission time typically required for a DTMF tone transmission. More particularly, as a result of the fact that a plurality of filters are often needed to effectively receive and identify a DTMF tone, a particular tone must be generated on the order of a minimum of at least 40 milliseconds in duration; 75 milliseconds per tone is more common. In addition, a "pause" generally on the order of 40 milliseconds is often used as a separation window between tones. Consequently, the transmission of on the order of 100 hexadigits may last 11.5 seconds or more; this is typically cumbersome and simply requires more time than is practical for the transmission of large volumes of data quickly and efficiently.

A system and method is thus needed which overcomes the acoustic transmission and acoustic coupling problems associated with existing DTMF transmission systems.

THE NEXT SUBSECTION IS A BRIEF DESCRIPTION OF THE DRAWING FIGURES

The subject invention will hereinafter be described in conjunction with the appended drawing figures, wherein like numerals denote like elements, and:

FIG. 1 is an exemplary embodiment of a tone dialing module in accordance with are aspect of the subject invention, shown broadcasting a tone into a telephone handset;

FIGS. 2A and B show a wave form of a low frequency component and a high frequency component, respectively, on an amplitude versus time graph;

FIG. 3 is a duration and pause window graph in accordance with one aspect of the present invention;

FIG. 4 sets forth pre-convened tables specific for Fourier analysis computation for use in accordance with the present invention;

FIG. 5 is a time graph setting forth standard DTMF timing information in the context of the present invention;

FIG. 6 shows a plurality of DTMF frequencies transmitted at a predetermined amplitude in accordance with one aspect of the present invention;

FIG. 7 shows a frequency versus gain factor transmission frequency response graph;

Figure 13A:
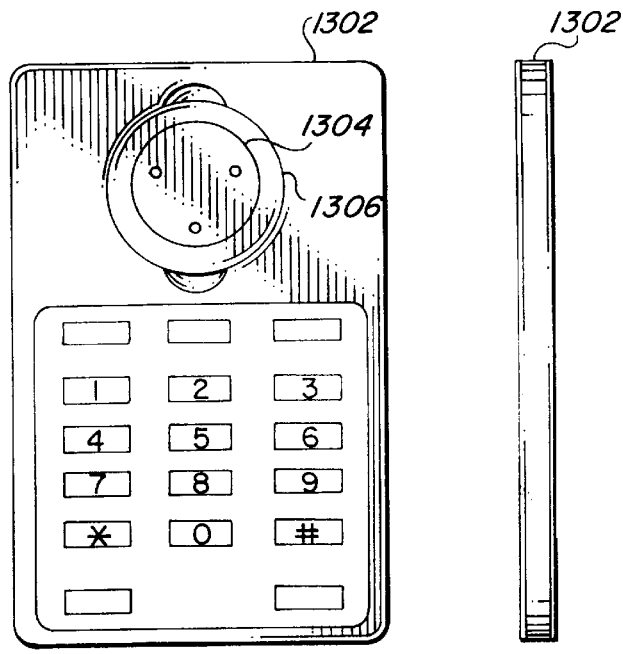
Figure 13B:
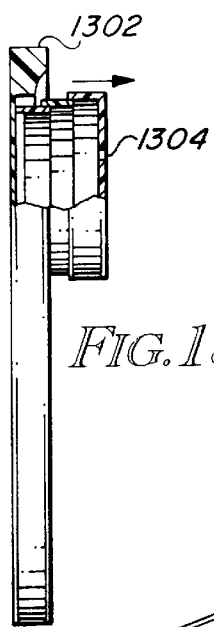
Figure 13C:
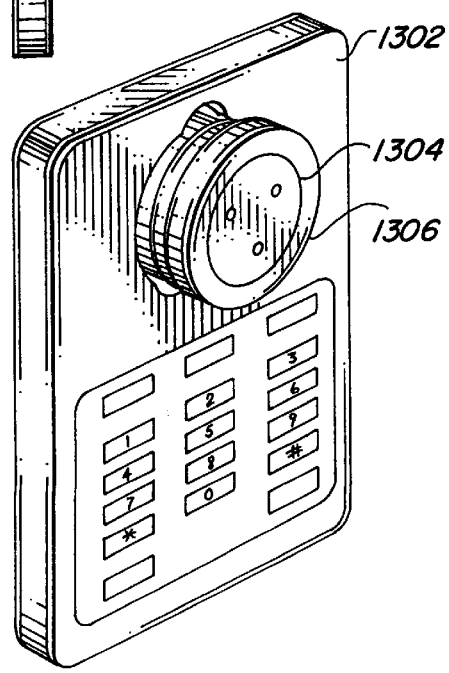
Figure 14:
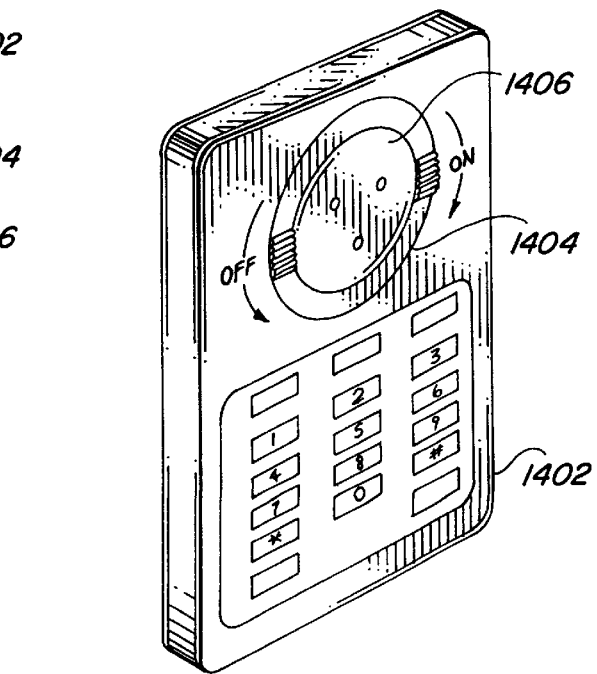

FIGS. 9–12 set forth graphical messages and data processing techniques relating thereto in the context of the present invention;

FIGS. 13A–C set forth various embodiments of a DTMF tone dialer device of the present invention;

FIGS. 14–16 set forth various alternate embodiments of a tone dialing device in accordance with the present invention; and FIGS. 17–18 set forth an exemplary embodiment of a DTMF tone dialing device useful in the context of the present invention shown interfacing with a telephone headset and a computer.

DETAILED DESCRIPTION OF PREFERRED EXEMPLARY EMBODIMENTS

Various embodiments of the present invention are hereinafter described in the context of enhancing the reliability of transmission of data over conventional telephone and other transmission lines, particularly data generated by a device which is not physically connected to the telephone.

Referring now to FIG. 1, an exemplary acoustic signal generator 2 is shown proximate a conventional telephone headset 1, with acoustic generator 2 shown generating an acoustic signal 3 which is received by headset 1. In this regard, it will be understood that acoustic signal 3 is intended to carry alphanumeric data, for example various characters including the numbers 0–9, letters A–Z, and various other characters known in the art. In accordance with a particularly preferred embodiment, acoustic signal 3 (and its electronic representation generated by the telephone 1) suitably comprises a DTMF tone or other plural frequency tone, for example consisting of two separate frequencies.

Referring now to FIGS. 1 and 2, acoustic generator 2 may suitably be configured to generate an acoustic signal such that both frequencies comprising the signal vary in amplitude as a function of time (as depicted in FIG. 2). More particularly, a first signal component A(low) represents the amplitude of the low frequency component of acoustic signal 3, and a second component A (high) suitably represents the high frequency component, showing a varying amplitude as a function of time. In accordance with one aspect of the present invention, the relation A(low)/A(high), i.e. the ratio of the low frequency component amplitude to the high frequency component amplitude will vary during the time of generation by acoustic generator 2. By varying the amplitudes of the high and low frequency components in a desired manner, it can be assured that at least for a portion of the generation time, both the high frequency component and the low frequency component will arrive at the destination detector (i.e. in IVR board) at a relatively similar amplitude, thereby substantially increasing the probability that the IVR board will recognize the DTMF signal. In accordance with the illustrated embodiment, the peak amplitude of the low frequency component gradually decreases as a function of time, whereas the peak amplitude of the high frequency component varies as an increasing function of time. It will be appreciated, however, that any convenient time varying functions may be employed to increase the probability that the DTMF signal will be properly interpreted at the destination detector regardless of the characteristic of the telephone mouthpiece microphone.

A further improvement of the foregoing method consists in digitizing the signals received and applying mathematical analysis methods (e.g. Fourier analysis) in order to detect the presence of the two frequencies which represent the particular alphanumeric character being transmitted. A further elaboration of this method consist in the detection of the pre-convened trend of change of the amplitude of each particular frequency component during detection as a criteria of the authentication or verification of the determination of the transmitted character.

Referring now to FIG. 3, data may be encoded and de-coded and carried by signals which are acoustical at least for a portion of their transmission path in accordance with a further aspect of the present invention. In particular, the acoustic signal generator of the present invention may be suitably configured to generate time ordered acoustic signals. These "time array" signals, which suitably comprise a concatenation of acoustic signals, may be spaced apart in a pre-determined time window sequence. In this way, at the detection end, the detecting circuitry may know in advance (on a time axis) when to expect the presence of the various frequencies representing the transmitted data. As a result, strong analysis techniques may be employed, e.g. Fourier analysis, in order to determine which frequencies have been sent for each particular window frame, as well as the point in time in which a signal should have been sent in accordance with the methods described herein.

Referring now to FIG. 4, a further aspect of the present invention surrounds the computation of pre-determined tables specific for the Fourier analysis computation corresponding to various DTMF frequencies in order to reduce detection time, i.e. the elapsed time from the instant the detection circuitry receives the digitized message until the analysis of the transmitted characters is completed. More particularly, the pre-calculated tables set forth in FIG. 4 may be used to minimize detection time in accordance with the Fourier conversions set forth therein. Specifically, equations 4.1 and 4.2 may be employed, where K corresponds to one of the various (e.g. 8) frequencies in the plural tone scheme.

Referring now to FIG. 5, in accordance with a further aspect of the present invention, it may be desirable to begin each alphanumeric acoustic signal message with the same standard DTMF signal 502, followed by the transmission of the alphanumeric acoustic signal message 504 to be transmitted. In this way, a real time signal, for example timing junction 506, may be detected by a conventional IVR board, thus notifying the detection circuitry of the beginning of the message, for example to permit the detection circuitry to start recording the analog signal which follows timing junction 506.

Referring now to FIG. 6, a transmitted message 602 may be conveniently preceded by standard DTMF tone 502 as well as a baseline message 604, for example interposed between message 602 and standard DTMF signal 502. More particularly, baseline data 604 suitably comprises a plurality of subpackets 604A–604H, for example relating to each of the various frequencies utilized in the plural transmission scheme, e.g. a representative sample of the various frequencies employed in message 602. In accordance with a further aspect of the present invention, each of the subpackets 604A–604H may suitably be transmitted at a pre-determined amplitude, for example a common amplitude. In this way, the detection circuitry is thereby afforded the capacity to compute the transmission complex frequency response characteristic (the "complex characteristic"), i.e., the composite response characteristic for the various transmission factors, including the mouthpiece microphone, telephone headset, PBX, telephone lines, noise environment, PTT's Central Office gain and absorption, multiplexing factors, satellite amplification, and the like. Indeed, since the foregoing factors may affect different frequencies differently, it may be highly desirable to determine the transmission complex frequency response characteristic for the entire transmission system for use in performing data processing functions at the detection circuitry. With momentary reference to FIG. 7, an exemplary transmission complex frequency response characteristic is shown for an exemplary transmission system.

Figure 8:
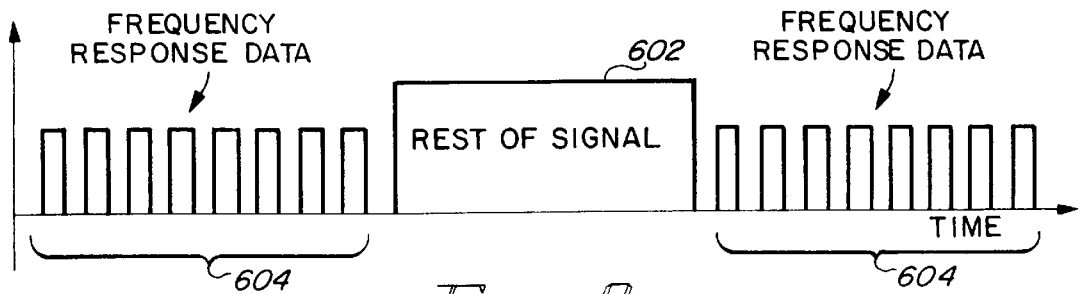
FIG. 8 illustrates the technique of transmitting frequency amplitude data at the beginning and at the end of an acoustic message in accordance with one aspect of the present invention.

Referring now to FIG. 8, it may also be desirable to send frequency amplitude data 604 both before and after the acoustic message data 602. In this way, the detection circuity may determine if the transmission complex frequency characteristic changes during the time of reception of signal 602. In this regard, once the detection circuitry is in possession of said information, the detection circuitry may suitably be configured to compute the absolute amplitude to be expected for each of the frequencies used to encode the information. With this knowledge, and further in view of the fact that the relative phase between the two frequencies comprising the DTMF transmission is generally known, the detection circuitry may precisely compute the digitized form of the analog signal for each of the transmitted characters. That is, the detection circuitry may construct a library of the precise form each transmitted character should have, after having been sent through the particular transmission hardware at a particular time. Finally, the use of baseline data packages 604 facilitates the quick and exact decoding of the information by comparison of the computed signal with the received signal.

In accordance with a further aspect of the present invention, acoustic encoding and de-coding of alphanumeric characters may be provided beyond the 16 characters typically available in standard DTMF schemes which employ four high tones and four low tones. More particularly, by employing various of the techniques described herein, the elimination of spurious noise is enhanced as well as resulting in an increased ability to accurately detect frequencies. Consequently, in accordance with a further aspect of the present invention, the same eight frequencies associated with DTMF schemes may be augmented such that a particular low frequency may be paired not only with any of the four high frequencies (as is known), but a particular low frequency may also be paired with any one of the three low frequencies. Similarly, in accordance with the present invention, a particular one of the four standard high frequencies may not only be paired with any one of the low frequencies (as is known), but a particular high frequency may also be paired with one of the other three high frequencies. In this way, each of the eight standard DTMF frequencies may be paired with any one of the remaining seven, resulting 28 different characters available from the eight frequency field, as compared to 16 possible characters available using conventional DTMF schemes.

In accordance with a further embodiment of the present invention, an exemplary acoustic signal generator may be further configured, and the corresponding detection circuitry may also be further configured, to permit the addition of one or more frequencies to the standard eight DTMF signals in order to permit the creation of an enlarged encoded table. For example, the addition of two more frequencies (totalling ten) results in 45 characters, which is enough for the transmission of a full alphanumeric spectrum in accordance with the present invention.

In accordance with a further embodiment, the transmission and detection circuitry may be configured to permit the transmission of three or more different frequencies for each character, as opposed to the two frequency scheme employed in presently known DTMF systems. In such a tri-tone scheme, it is possible to increase the number of characters to 120, by choosing three out of ten available frequencies for each character. This increase in the number of available characters substantially reduces the number of characters required to transmit a given message. By reducing the transmission time, the practical applications of the plural tone multi-frequency schemes described herein may be increased.

Figure 9:
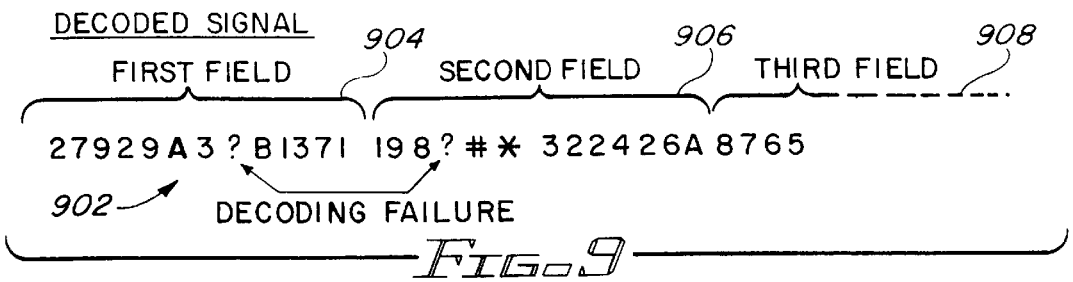
Figure 10:
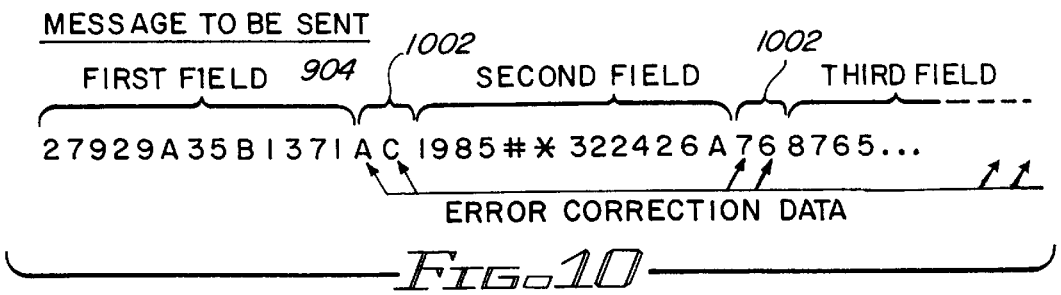

Referring now to FIGS. 9 and 10, an exemplary decoded signal is shown as a string of alphanumeric characters. As is well-known in the art, powerful and mature error correction algorithms have been proposed, which may be employed to compute one or more characters which are missing from the transmitted signal, due to, for example, the presence of spurious noise. In accordance with a preferred embodiment of the invention, consider an exemplary message 902 which comprises 39 characters. In accordance with the illustrated embodiment, message 902 may be conveniently parcelled into a first field 904, a second field 906, and a third field 908, each comprising, for example, 13 characters. As discussed in greater detail below in connection with FIG. 10, it may-also be advantageous to add additional error correction factors 1002 between respective fields 904, 906, 908 and so on.

With continued reference to FIGS. 9 and 10, those skilled in the art will appreciate that presently known error correction algorithms and techniques often involve the addition of characters ("added characters") at the beginning or at the end of a transmitted message. These additional characters are useful in computing any characters which were not properly decoded, for example because of transmission noise. In accordance with one aspect of the present invention, a predetermined window of time may be assigned to each message 902, each sub-message 906, and indeed, to each character within each message and sub-message. Consequently, although transmission noise may result in the non-determination of one or more characters, the window or position in which the non-determined character appears may nonetheless be unambiguously determined. Thus, in accordance with one aspect of the present invention, an interrogation sign (e.g. "?") is depicted in FIG. 9 to illustrate such a non-determined character in a known position. By adding additional characters 1002, and further in view of the known position of each interrogation sign (non-determined character), the computation of the non-determined characters may be greatly facilitated, for example in the context of known error correction algorithms. For example, if two additional characters 1002 are added between each subfield, it may be possible to compute one or two characters per subfield which are affected by noise.

Figure 11:
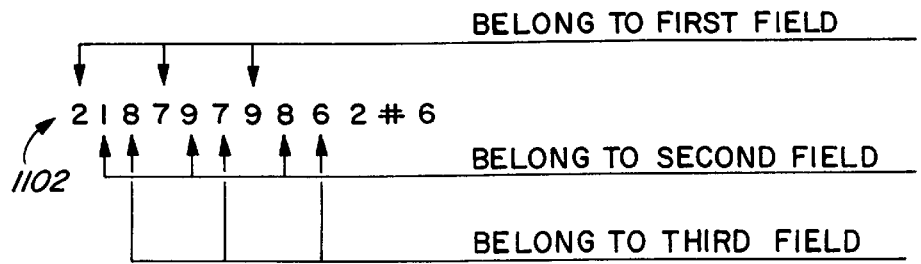

Referring now to FIG. 11, transmission and detection may be further enhanced through the orderly mixing of the aforementioned fields to be carried out before the generation of the acoustic signals, that is, before the transducer generates the acoustic signal. More particularly, a time multiplexed message 1102 may suitably be constructed using the various characters comprising respective subfields 904, 906, and 908. In particular, the first character (namely "2") in message 1102 suitably corresponds to the first character of first subfield 904. The second character in message 1102 suitably corresponds to the first character in second field 906 (namely "1"), and the third character in message 1102 suitably corresponds to the first character in third field 908 (namely "8"). Similarly, the forth character in message 1102 corresponds to the second character in subfield 904, the fifth character in message 1102 corresponds to second character in field 906, and so on. As a consequence of this mixing, and by using the same proportion of additional characters 1002 to message characters, the ability to ascertain non-determined characters in greatly enhanced.

Figure 12:
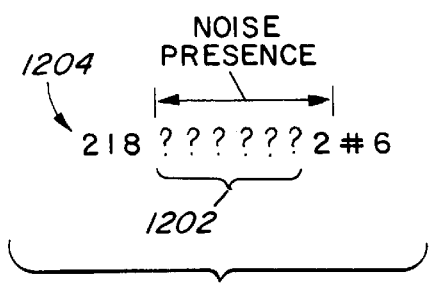

More particularly and with momentary reference to FIG. 12, consider a relatively long incident of spurious noise, e.g. 240 milliseconds long, which precludes the determination of six consecutive characters (e.g. sub-string 1202) in the message string 1204 shown in FIG. 12. By applying the foregoing techniques without otherwise enlarging the message, the consecutive non-determined characters shown in FIG. 12 are "spread out" among the various subfields 904, 906, etc. By reducing the number of consecutive non-determined characters, the ability to determine these characters using error correction algorithms is concomitantly increased. Thus, by adding two additional characters 1002 per subfield, it may be possible to ascertain the characters corresponding to six non-determined characters within a single message 902.

Referring now to FIGS. 13A–C, a further embodiment of an exemplary tone dialing generator 1302 suitably comprises a thin, credit card sized device which suitably exhibits dimensions on the order of standard smart card dimensions. For example, device 1302 is suitably on the order of a few millimeters thick, with the necessary electronic components embedded within the substrate which may suitably be made from plastic. These electronic components generate the analog electronic signals which are input to a suitable transducer (speaker) 1304 which, in turn, generates the acoustic signal. In accordance with a preferred embodiment, speaker 1304 employs piezoelectric transducing components. Notwithstanding the limited acoustic fidelity of presently available, inexpensive piezoelectric speakers, use of the signal processing techniques set forth herein in combination with the time segmentation methods discussed herein will result in a very high proportion of successful transmission and decoding of acoustical signals.

With continued reference to FIG. 13, an extractable cone 1306 may suitably be employed in a manner which circumscribes speaker 1304. Retractable cone 1306 may be used to shield environmental noise during tone generation, thereby improving the signal-to-noise ratio of speaker 1304. After transmission is completed, cone 1306 may be retracted and returned to its original position, such that the card 1302 may be placed in a wallet for convenient carrying. Cone 1306 may suitably be made from any appropriate material, including thin film, or a suitable textile, fabric, or the like. Alternatively, cone 1306 may be made from tyvek. Cone 1306 may also be pleated, as desired.

In accordance with a further embodiment of the present invention, a key pad setting forth various characters to be transmitted by a tone dialing device in accordance with the present invention may be disposed on the same side of the card as the speaker, or on the opposite side of the card as the speaker. In the latter embodiment wherein the "DTMF" key pad is disposed opposite from the speaker, it may be possible to place the speaker (regardless of whether the speaker also incorporates a retractable cone) directly against the telephone mouthpiece, thereby exposing the key pad for convenient manipulation by the user.

Referring now to FIG. 14, a thin card tone generating device 1402 may comprise a screwable on/off switch 1404 which may be rotated in a first direction (e.g. clockwise) to switch the device on, and counter clockwise to switch the device off. In addition, the on/off switch 1404 which surrounds a suitable speaker 1406 may be configured to extend from the plane of card 1402 in the on position, and retract to the planar position when in the off position.

Referring now to FIG. 15, an alternative embodiment of a tone dialing device 1502 suitably comprises a PCMCIA connector 1504 which permits device 1502 to interchange data with and otherwise communicate with virtually any PCMCIA compatible device, for example by allowing card 1502 to be inserted into the PCMCIA slot of a host device.

Referring now to FIG. 16, an alternative embodiment of a tone transmitting device 1602 suitably comprises a card slot 1604 for receiving a card 1606, for example a card which bears information on a magnetic stripe, or the like. Alternatively, card 1606 may comprise a smart card, in which case device 1602 suitably incorporates corresponding smart card contacts (not shown), for example within the interior of card slot 1604.

Referring now to FIGS. 17 and 18, a tone generation device 1702 may be suitably interposed in a cord 1704 which extends between a conventional telephone base 1706 and a telephone handset 1708. Alternatively, tone dialing device 1702 may be equipped with RF detection and/or transmission circuitry, such that it may interface with conventional cordless telephones.

With continued reference to FIGS. 17 and 18, a connector 7 may be employed to connect tone generating device 1710 to telephone 1706; in addition, a tone generation device 1702 may also include a slot 1710 for convenient receipt of a connector (not shown) associated with phone cord 1704. In this way, tone generating device 1702 may be manufactured and distributed as a module which may be attached to a standard telephone without having to reconfigure the telephone other than to interpose device 1702 between the base and the handset.

With continued reference to FIGS. 17 and 18, tone generating device 1702 may be also equipped with a connector 1714 suitable for connecting device 1702 to an analog digital converter (ADC) 1716 to thereby permit device 1702 to interface with a computer 1718. In this way, tone generating device 1702 may be configured to "listen" to the analog electric signals which represent the encoded messages discussed herein, whereupon these analog electric signals may be digitized, either by device 1702 or by ADC 1716. If desired, the digitized signals may then be decoded by device 1702 or, alternatively, transmitted to computer 1718 for decoding and/or further processing.

Although the present invention is set forth herein in the context of the appended drawing figures, it will be appreciated that the invention is not limited to the specific forms shown. Various modifications and enhancements in the design and arrangement of the various components, processes, steps and descriptions thereof as set forth herein may be made without departing from the spirit and scope of the present invention as set forth in the appended claims.

What is claimed is:

1. A method for encoding and decoding data carried by a plurality of signals transmitted from a portable acoustic signal generator to a destination unit through the use of transmission equipment, wherein the signals are acoustical for at least a portion of the transmission path, the method comprising the steps of:

generating, via the signal generator, a plurality of time ordered acoustic signals spaced apart in a pre-determined time window sequence, wherein the plurality of time ordered acoustic signals comprises at least two data characters acoustically encoded;

removably coupling the signal generator to a microphone associated with the transmission equipment such that the plurality of acoustic signals is received by the microphone;

transmitting the plurality of signals over the transmission equipment;

detecting, by the destination unit, the plurality of signals;

determining, by the destination unit, a plurality of time ordered time slots for each of the signals; and analyzing, by the destination unit, each of the time ordered time slots to derive the data character originally encoded in the acoustical signal generator.

2. The method of claim 1 further comprising the step of generating, via the signal generator, a pre-determined specific signal at the beginning of the plurality of time ordered acoustic signals.

3. The method of claim 1 further comprising the steps of:

generating, via the signal generator, a pre-determined baseline signal that is included with the plurality of time ordered acoustic signals; and computing, by the destination unit, a transmission complex frequency response characteristic from the baseline signal.

4. The method of claim 1, wherein each of the data characters is represented by two different frequencies.

5. The method of claim 1, wherein the two different frequencies vary in amplitude as a function of time.

6. The method of claim 1, wherein each of the data characters is represented by three different frequencies out of a pre-determined set of frequencies.

7. The method of claim 1, wherein the generating step further comprises adding at least one error correction character to the data to be encoded into the plurality of the time ordered acoustic signals.

8. The method of claim 1, wherein the acoustical signal generator comprises a substantially planar, credit card-sized module with embedded electronic components and a speaker which generates the acoustic signal.

9. The method of claim 1, wherein the acoustical signal generator further includes a standard PCMCIA connector configured to allow compatibility with any PCMCIA compatible device.

10. The method of claim 1, wherein the acoustical signal generator has a standard chip card slot configured to receive a smart chip card.

* * * * *